(12) United States Patent
Eftekhari et al.

(10) Patent No.: US 12,671,129 B2
(45) Date of Patent: Jun. 30, 2026

(54) THERMAL BARRIER ASSEMBLIES FOR TRACTION BATTERY PACKS

(71) Applicant: FORD GLOBAL TECHNOLOGIES, LLC, Dearborn, MI (US)

(72) Inventors: Mohammadreza Eftekhari, Novi, MI (US); Kevin Durand Byrd, Novi, MI (US); Kanchana Perumalla, Troy, MI (US); Jeffrey Scott Dahl, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 639 days.

(21) Appl. No.: 18/162,912

(22) Filed: Feb. 1, 2023

(65) Prior Publication Data

US 2024/0079682 A1     Mar. 7, 2024

Related U.S. Application Data

(60) Provisional application No. 63/403,445, filed on Sep. 2, 2022.

(51) Int. Cl.
H01M 10/658     (2014.01)
B60L 50/64     (2019.01)
H01M 50/211     (2021.01)

(52) U.S. Cl.
CPC ........... H01M 10/658 (2015.04); B60L 50/64 (2019.02); H01M 50/211 (2021.01)

(58) Field of Classification Search
None
See application file for complete search history.

(56) References Cited

U.S. PATENT DOCUMENTS

| | | | | | |
|---|---|---|---|---|---|
| 8,541,126 | B2 * | 9/2013 | Hermann | .............. | H01M 10/66 |
| | | | | | 429/152 |
| 8,785,026 | B2 * | 7/2014 | Hu | ...................... | H01M 10/625 |
| | | | | | 429/120 |
| 10,651,521 | B2 * | 5/2020 | Onnerud | ................ | H01G 11/06 |
| 10,790,489 | B2 * | 9/2020 | Lampe-Onnerud | .......................... | |
| | | | | | H01M 50/509 |
| 11,127,996 | B2 * | 9/2021 | Yeh | ...................... | H01M 10/658 |
| 2018/0323413 | A1 * | 11/2018 | Nicholls | ............. | H01M 50/293 |
| 2020/0058971 | A1 * | 2/2020 | Smith | ................. | H01M 10/647 |
| 2020/0112012 | A1 * | 4/2020 | Fernandez-Galindo | ..................... | |
| | | | | | H01M 50/503 |

(Continued)

FOREIGN PATENT DOCUMENTS

| | | |
|---|---|---|
| CN | 213520173 U | 6/2021 |
| WO | 2021075743 A1 | 4/2021 |
| WO | 2022024076 A1 | 2/2022 |

*Primary Examiner* — Kevin M Bernatz

(74) *Attorney, Agent, or Firm* — David B. Kelley; Carlson, Gaskey & Olds, P.C.

(57)     ABSTRACT

Thermal barrier assemblies are provided for traction battery packs. An exemplary thermal barrier assembly may be configured to block or even prevent thermal energy associated with a battery thermal event from moving from cell-to-cell, compartment-to-compartment, and/or cell stack-to-cell stack within the traction battery pack. The thermal barrier assembly may include features such as a protective housing and a thermal insulating barrier provided within the protection housing. The protecting housing may be made of a metallic, ceramic, or polymeric material, for example. The thermal insulating barrier may include an aerogel, a foam, or an inorganic paper, for example.

14 Claims, 6 Drawing Sheets

(56)  References Cited

U.S. PATENT DOCUMENTS

| | | | |
|---|---|---|---|
| 2020/0259144 A1* | 8/2020 | Kang | H01M 10/625 |
| 2021/0163303 A1 | 6/2021 | Evans et al. | |
| 2021/0167438 A1* | 6/2021 | Evans | H01M 50/204 |
| 2021/0167441 A1 | 6/2021 | You et al. | |
| 2021/0249709 A1 | 8/2021 | Schriever et al. | |
| 2021/0363699 A1 | 11/2021 | Afshari et al. | |
| 2022/0021070 A1* | 1/2022 | Yang | H01M 10/6554 |
| 2022/0093989 A1 | 3/2022 | Quy et al. | |
| 2022/0149475 A1* | 5/2022 | Müller | H01M 50/278 |
| 2022/0181715 A1* | 6/2022 | Jiang | C08J 7/05 |
| 2022/0294044 A1* | 9/2022 | Kristy | H01M 10/658 |
| 2023/0124482 A1* | 4/2023 | Boddakayala | H01M 10/613 |
| | | | 429/120 |
| 2024/0079683 A1* | 3/2024 | Eftekhari | H01M 10/6551 |
| 2024/0170767 A1* | 5/2024 | Boddakayala | H01M 10/625 |
| 2024/0297395 A1* | 9/2024 | Zhang | H01M 50/293 |
| 2024/0308294 A1* | 9/2024 | Vanderwees | B60H 1/00328 |
| 2025/0372768 A1* | 12/2025 | Deng | H01M 10/658 |
| 2026/0011812 A1* | 1/2026 | Cahill | H01M 10/48 |
| 2026/0038915 A1* | 2/2026 | Boddakayala | H01M 10/658 |

* cited by examiner

THERMAL BARRIER ASSEMBLIES FOR TRACTION BATTERY PACKS

CROSS-REFERENCE TO RELATED APPLICATIONS

This disclosure claims priority to U.S. Provisional Application No. 63/403,445, which was filed on Sep. 2, 2022 and is incorporated herein by reference.

TECHNICAL FIELD

This disclosure relates generally to traction battery packs, and more particularly to thermal barrier assemblies for blocking the movement of thermal energy within traction battery packs.

BACKGROUND

Electrified vehicles include a traction battery pack for powering electric machines and other electrical loads of the vehicle. The traction battery pack includes a plurality of battery cells and various other battery internal components that support electric vehicle propulsion.

SUMMARY

A traction battery pack according to an exemplary aspect of the present disclosure includes, among other things, a cell stack including a plurality of battery cells, and a thermal barrier assembly arranged between a first battery cell and a second battery cell of the plurality of battery cells. The thermal barrier assembly includes a protective housing and a thermal insulating barrier that is disposed within the protective housing. The thermal insulating barrier includes an aerogel material, a foam material, or an inorganic paper.

In a further non-limiting embodiment of the foregoing traction battery pack, the plurality of battery cells are stacked between a first cross-member beam and a second cross-member.

In a further non-limiting embodiment of either of the foregoing traction battery packs, the protective housing is comprised of a stainless steel foil, and the thermal insulating barrier includes the aerogel material.

In a further non-limiting embodiment of any of the foregoing traction battery packs, the thermal barrier assembly further includes a fin.

In a further non-limiting embodiment of any of the foregoing traction battery packs, a first fin section of the fin is disposed inside the protective housing, and a second fin section of the fin extends outside of the protective housing.

In a further non-limiting embodiment of any of the foregoing traction battery packs, the second fin section extends at a transverse angle relative to the first fin section and is fixedly secured to an enclosure cover of the traction battery pack.

In a further non-limiting embodiment of any of the foregoing traction battery packs, the fin is completely outside of the protective housing.

In a further non-limiting embodiment of any of the foregoing traction battery packs, the protective housing is made of stainless steel, and the thermal insulating barrier includes the aerogel material.

In a further non-limiting embodiment of any of the foregoing traction battery packs, a thermal fin is mounted to the protective housing and to an enclosure cover of the traction battery pack.

In a further non-limiting embodiment of any of the foregoing traction battery packs, the protective housing is made of stainless steel.

In a further non-limiting embodiment of any of the foregoing traction battery packs, the thermal insulating barrier includes the inorganic paper.

In a further non-limiting embodiment of any of the foregoing traction battery packs, the protective housing is made of a mica material.

In a further non-limiting embodiment of any of the foregoing traction battery packs, the thermal insulating barrier includes the inorganic paper.

In a further non-limiting embodiment of any of the foregoing traction battery packs, the protective housing is made of a polymeric material, and the thermal insulating barrier includes the aerogel material or the foam material.

A traction battery pack according to another exemplary aspect of the present disclosure includes, among other things, a battery cell stack and a thermal barrier assembly arranged to partition the battery cell stack into at least a first compartment and a second compartment. The thermal barrier assembly includes a protective housing and a thermal insulating barrier disposed within the protective housing. The thermal insulating barrier includes an aerogel material or a foam material.

In a further non-limiting embodiment of the foregoing traction battery pack, the protective housing is made of a stainless steel foil, and the thermal insulating barrier includes the aerogel material.

In a further non-limiting embodiment of either of the foregoing traction battery packs, the protective housing is made of stainless steel, and the thermal insulating barrier includes the foam material.

In a further non-limiting embodiment of any of the foregoing traction battery packs, the protective housing is made of a polymeric material, and the thermal insulating barrier includes the aerogel material.

In a further non-limiting embodiment of any of the foregoing traction battery packs, the protective housing is made of a polymeric material, and the thermal insulating barrier includes the foam material.

In a further non-limiting embodiment of any of the foregoing traction battery packs, the thermal barrier assembly further includes a fin that is secured to an enclosure cover of the traction battery pack with an adhesive.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details thermal barrier assemblies for traction battery packs. An exemplary thermal barrier assembly may be configured to block or even prevent thermal energy associated with a battery thermal event from moving from cell-to-cell, compartment-to-compartment, and/or cell stack-to-cell stack within the traction battery pack. The thermal barrier assembly may include features such as a protective housing and a thermal insulating barrier provided within the protection housing. The protecting housing may be made of a metallic, ceramic, or polymeric material, for example. The thermal insulating barrier may include an aerogel, a foam, or an inorganic paper, for example. These and other features are discussed in greater detail in the following paragraphs of this detailed description.

Figure 1:
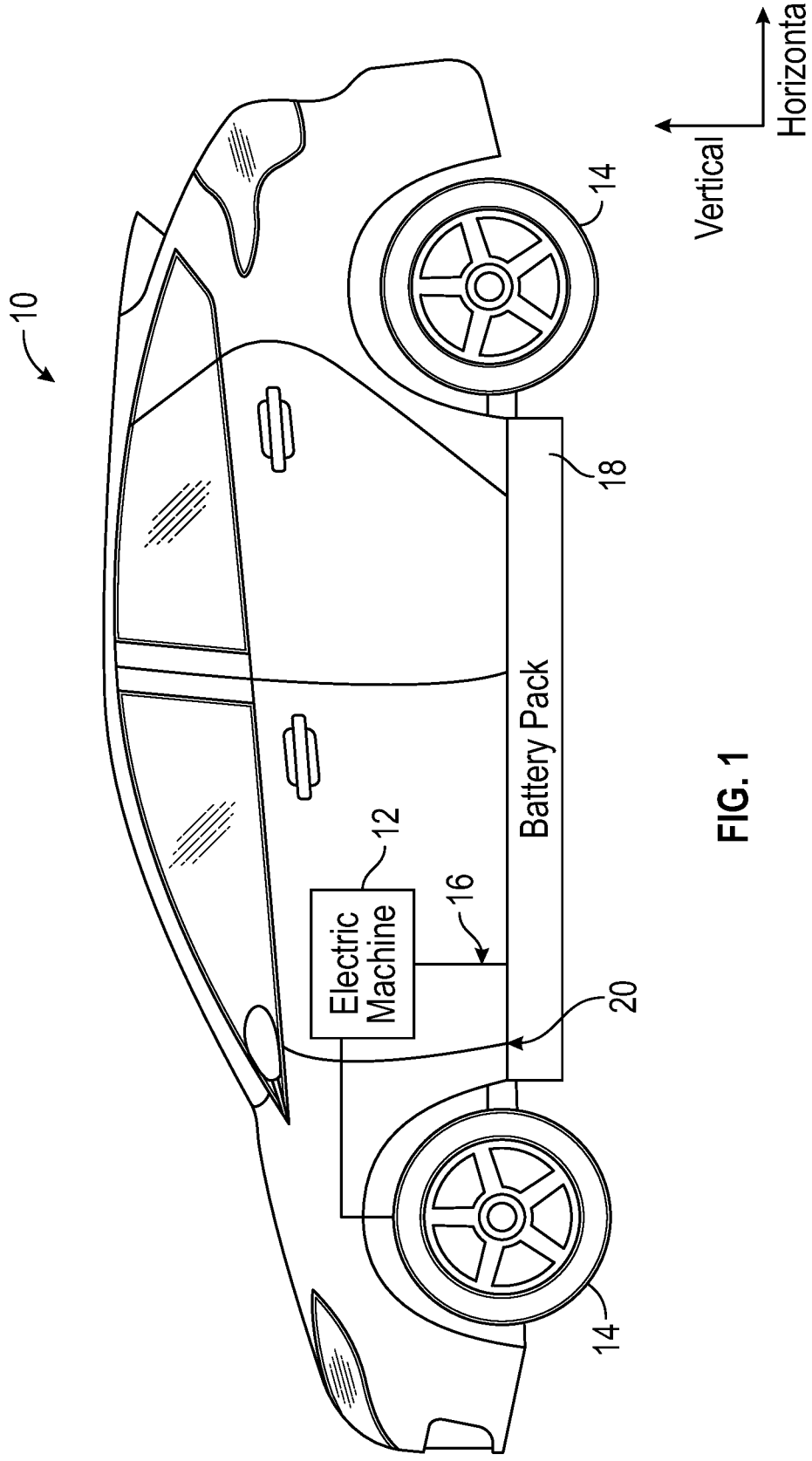
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the powertrain of the electrified vehicle 10 could be equipped with an internal combustion engine that can be employed either alone or in combination with other power sources to propel the electrified vehicle 10.

In the illustrated embodiment, the electrified vehicle 10 is depicted as a car. However, the electrified vehicle 10 could alternatively be a sport utility vehicle (SUV), a van, a pickup truck, or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more wheels 14 of the electrified vehicle 10.

A voltage bus 16 may electrically couple the electric machine 12 to a traction battery pack 18. The traction battery pack 18 is an exemplary electrified vehicle battery. The traction battery pack 18 may be a high voltage traction battery pack assembly that includes a plurality of battery cells capable of outputting electrical power to power the electric machine 12 and/or other electrical loads of the electrified vehicle 10. Other types of energy storage devices and/or output devices could alternatively or additionally be used to electrically power the electrified vehicle 10.

The traction battery pack 18 may be secured to an underbody 20 of the electrified vehicle 10. However, the traction battery pack 18 could be located elsewhere on the electrified vehicle 10 within the scope of this disclosure.

Figures 2, 3:
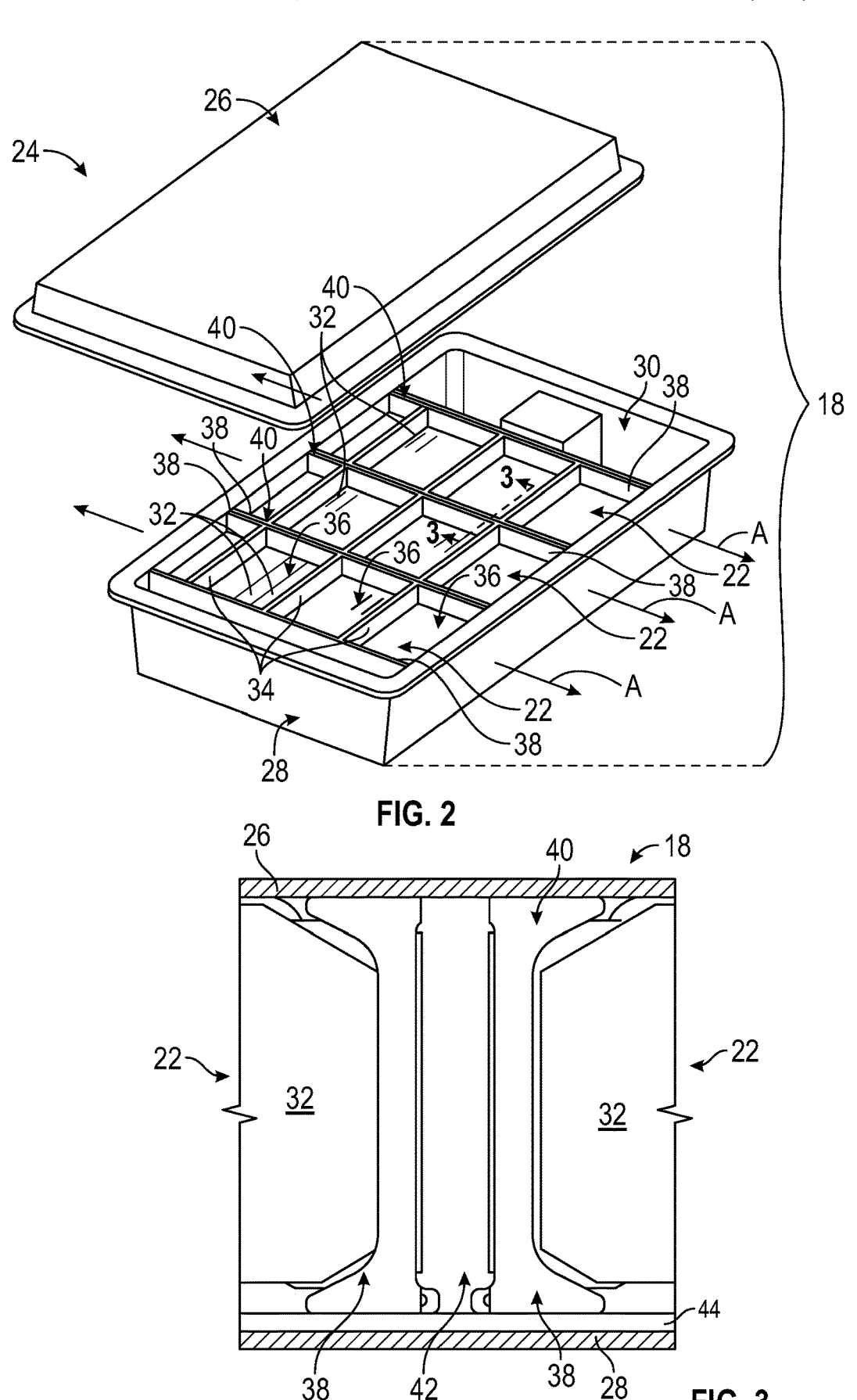
FIG. 2 is an exploded perspective view of a traction battery pack for an electrified vehicle.
FIG. 3 is a cross-sectional view through section 3-3 of FIG. 2.

FIGS. 2 and 3 further illustrates details associated with the traction battery pack 18 of the electrified vehicle 10. The traction battery pack 18 may include a plurality of cell stacks 22 housed within an interior area 30 of an enclosure assembly 24. The enclosure assembly 24 of the traction battery pack 18 may include an enclosure cover 26 and an enclosure tray 28. The enclosure cover 26 may be secured (e.g., bolted, welded, adhered, etc.) to the enclosure tray 28 to provide the interior area 30 for housing the cells stacks 22 and other battery internal components.

Each cell stack 22 may include a plurality of battery cells 32. The battery cells 32 of each cell stack 22 may be stacked side-by-side relative to one another along a cell stack axis A. The battery cells 32 store and supply electrical power for powering various components of the electrified vehicle 10. Although a specific number of the cell stacks 22 and battery cells 32 are illustrated in the various figures of this disclosure, the traction battery pack 18 could include any number of the cell stacks 22, with each cell stack 22 having any number of individual battery cells 32.

In an embodiment, the battery cells 32 are lithium-ion pouch cells. However, battery cells having other geometries (cylindrical, prismatic, etc.) and/or chemistries (nickel-metal hydride, lead-acid, etc.) could alternatively be utilized within the scope of this disclosure. The exemplary battery cells 32 can include tab terminals extending from a battery cell housing. An aluminum film may provide the battery cell housing, for example.

The battery cells 32 of each cell stack 22 may be arranged between a pair of cross-member beams 38. The cross-member beams 38 may be configured to hold the battery cells 32 and at least partially delineate the cell stacks 22.

Immediately adjacent-cross member beams 38 may establish a cross-member assembly 40 disposed between adjacent cell stacks 22 of the traction battery pack 18. The cross-member assemblies 40 may be configured to transfer a load applied to a side of the electrified vehicle 10, for example. Each cross-member beam 38 of the cross-member assemblies 40 may be a structural beam that can help accommodate tension loads from battery cell 32 expansion and compression loads. The cross-member assemblies 40 are therefore configured to increase the structural integrity of the traction battery pack 18.

The cross-member assemblies 40 may also establish a battery pack venting system for communicating battery cell vent byproducts from the traction battery pack 18 during battery thermal events. For example, the cross-member assemblies 40 may establish passageways 42 (best shown in FIG. 3) that can communicate battery cell vent byproducts from the cell stacks 22 toward a position where the battery cell vent byproducts can be expelled from the traction battery pack 18.

In the exemplary embodiment, first and second adjacent cross-member beams 38 may establish a first side and a second side, respectively, of the passageway of the cross-member assembly 40. Further, a vertically upper side of the passageway may be established by the enclosure cover 26 (see FIG. 3), and a vertically lower side of the passageway 42 may be established by a heat exchanger plate 44 positioned against the enclosure tray 28 (see FIG. 3). In another embodiment, the heat exchanger plate 44 may be omitted and the vertically lower side of the passageway 42 may be established by the enclosure tray 28. Vertical and horizontal, for purposes of this disclosure, are with reference to ground and a general orientation of traction battery pack 18 when installed within the electrified vehicle 10 of FIG. 1.

Each cross-member beam 38 may include one or more openings (not shown) for communicating the battery cell vent byproducts through the beams and into the passageway 42. The openings thus provide a path for battery cell vent byproducts to move to the passageways 42 as required. Each cross-member beam 38 may additionally include one or more openings (not shown) for accommodating cell tabs of the battery cells 32.

The cross-member beams 38 may be adhesively secured to the enclosure cover 26 and to the heat exchanger plate 44 and/or enclosure tray 28. The adhesive can seal these interfaces to inhibit battery cell vent byproducts escaping the passageway 42 through these areas.

In an embodiment, the cells stacks 22, the cross-member assemblies 40, and the respective passageways 42 extend longitudinally in a cross-vehicle direction. However, other configurations are further contemplated within the scope of this disclosure.

One or more thermal barrier assemblies 34 may be arranged along the respective cell stack axis A of each cell stack 22. The thermal barrier assemblies 34 may divide or compartmentalize each cell stack 22 into two or more groupings or compartments 36 of battery cells 32. Should, for example, a battery thermal event occur in one of the cell stacks 22, the thermal barrier assemblies 34 may block or even prevent thermal energy associated with the thermal event from moving from cell-to-cell, compartment-to-compartment, and/or cell stack-to-cell stack, thereby inhibiting thermal propagation inside the traction battery pack 18.

Each compartment 36 may hold one or more of the battery cells 32 within one of the cell stacks 22. In an embodiment, the battery cells 32 of each cell stack 22 are held within one of four compartments 36. However, other configurations, including configurations that utilize a greater or fewer number of thermal barrier assemblies 34 and compartments 36, could be used within the scope of this disclosure.

Figure 4:
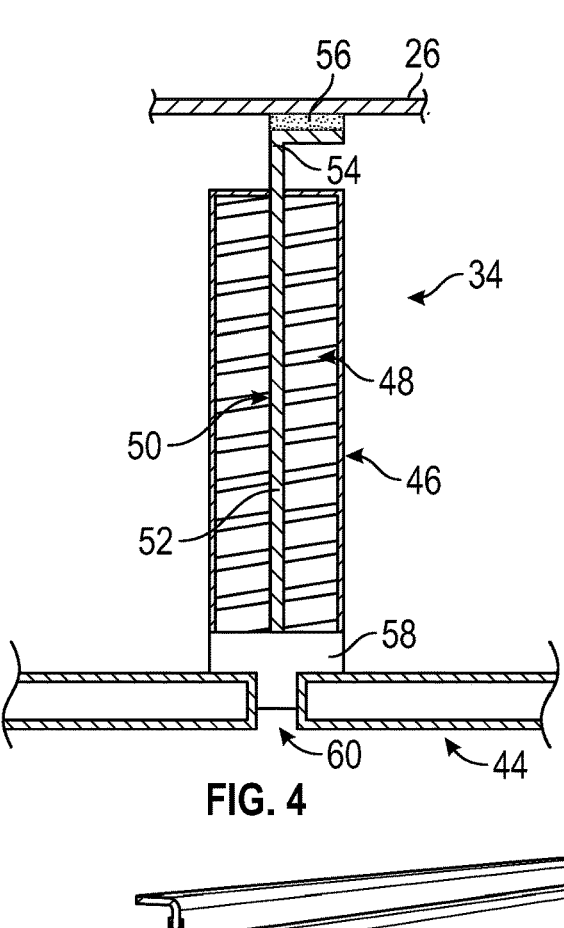
FIG. 4 illustrates a thermal barrier assembly of the traction battery pack of FIGS. 2 and 3.
Figure 5:
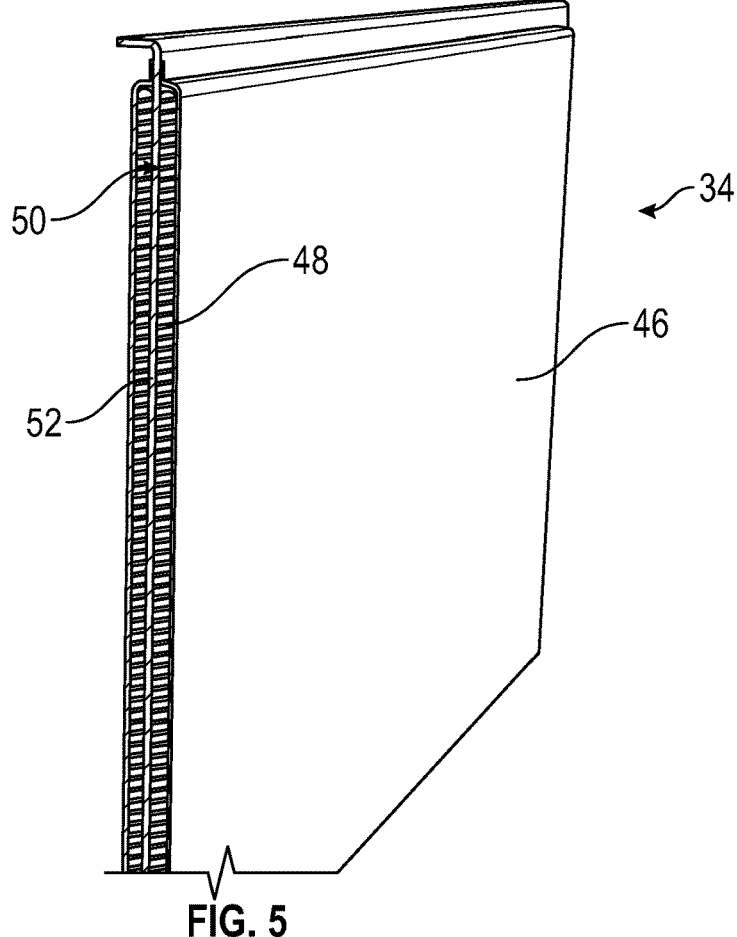
FIG. 5 is a cross-sectional view of the thermal barrier assembly of FIG. 4.

FIGS. 4 and 5 further illustrate details associated with one of the thermal barrier assemblies 34 of the traction battery pack 18. The additional thermal barrier assemblies of the traction battery pack 18 could include an identical design to the thermal barrier assembly 34 shown in FIGS. 4-5.

The exemplary thermal barrier assembly 34 may include a protective housing 46, a thermal insulating barrier 48 within the protective housing 46, and a fin that is connected to the protective housing 46. The thermal insulating barrier 48 may be encapsulated inside the protective housing 46 and is therefore shielded by the protective housing 46.

The protective housing 46 may be made of a metallic material. In an embodiment, the protective housing 46 is configured as a stainless steel foil. However, other materials and configurations are further contemplated within the scope of this disclosure.

The thermal insulating barrier 48 may possess a relatively high thermal resistance (and thus a low thermal conductivity) for slowing or even preventing thermal propagation within the traction battery pack 18. In an embodiment, the thermal insulating barrier 48 may include an aerogel material, such as a silica-based aerogel, for example. In another embodiment, the thermal insulating barrier 48 may include a foam material, such as a silicone foam, for example. However, other material or combinations of materials could with utilized to construct the thermal insulating barrier within the scope of this disclosure.

In an embodiment, the thermal insulating barrier 48 includes a thickness of between about 1 mm and about 10 mm. In another embodiment, the thermal insulating barrier 48 includes a thickness of between about 2 mm and about 4 mm. In yet another embodiment, the thermal insulating barrier 48 includes a thickness of between about 3 mm and about 4 mm. In this disclosure, the term "about" means that the expressed quantities or ranges need not be exact but may be approximated and/or larger or smaller, reflecting acceptable tolerances, conversion factors, measurement error, etc. A person of ordinary skill in the art having the benefit of this disclosure would understand how to select an optimal thickness of the thermal insulating barrier 48 for providing any desired level of thermal resistance.

The fin 50 may be made of a metallic material. In an embodiment, the fin 50 is made of stainless steel. In another embodiment, the fin 50 is made of aluminum. The fin 50 may be coated with a high temperature resistance and thermally nonconductive coating to avoid thermal heat transfer short-circuiting. However, other materials including high temperature resistance thermoplastic and thermoset composites could be utilized to construct the fin 50 within the scope of this disclosure.

The fin 50 may include a first fin section 52 disposed inside the protective housing 46, and a second fin section 54 that is disposed outside of the protective housing 46. The thermal insulating barrier 48 may be disposed around the first fin section 52 of the fin 50. In an embodiment, the second fin section 54 extends at a transverse angle relative to the first fin section 52.

The second fin section 54 may interface with the enclosure cover 26. In an embodiment, the second fin section 54 is fixedly secured to the enclosure cover 26 to increase the overall rigidity of the traction battery pack 18.

A thermal adhesive 56 may be utilized to secure the second fin section to the enclosure cover 26. The thermal adhesive 56 may be an epoxy based adhesive or a urethane based adhesive, for example.

The protective housing 46 may further include a locator 58 that is disposed on an opposite end of the protective housing 46 from the second fin section 54. The locator 58 may be made of a solid plastic or a compliance rubber, for example. The locator 58 may be configured to interface with the heat exchanger plate 44 and can be used as an assembly aid, for sealing of the thermal barrier/heat exchanger plate interface, and to improve the overall stiffness of the heat exchanger plate 44. The heat exchanger plate 44 may include one or more slots 60 sized to receive the locator 58. In addition to acting as a locating feature for locating the thermal barrier assembly 34 relative to the heat exchanger plate 44, the locator 58 may establish a thermal break between neighboring battery cells of the cell stack within which the thermal barrier assembly 34 is disposed.

In an embodiment, the locator 58 includes a T-shaped cross-section. However, other cross-sectional shapes are contemplated within the scope of this disclosure.

Figure 6:
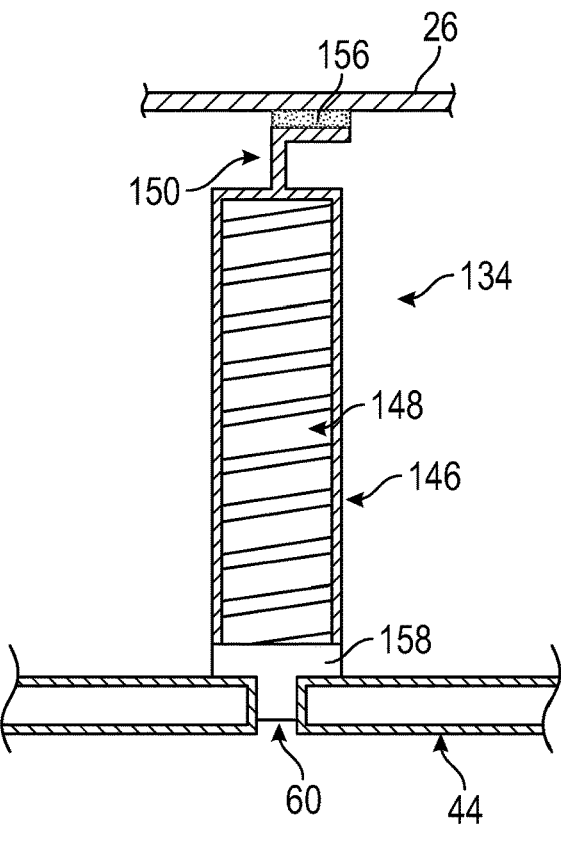
FIG. 6 illustrates another exemplary thermal barrier assembly.
Figure 7:
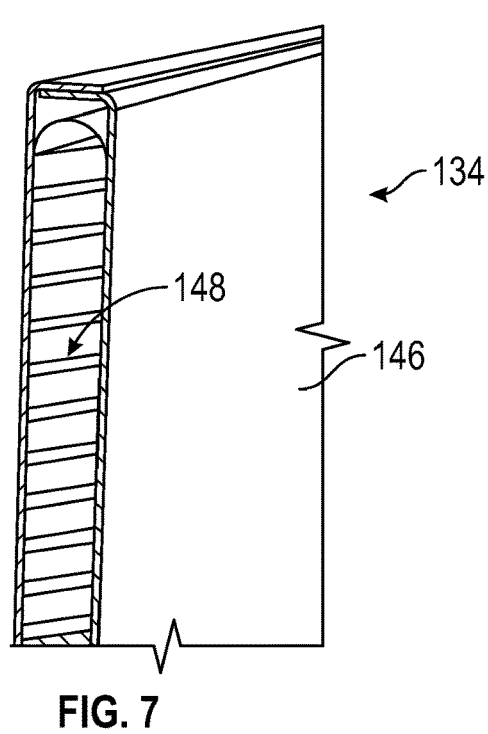
FIG. 7 is a cross-sectional view of the thermal barrier assembly of FIG. 6.

FIGS. 6-7 illustrate another exemplary thermal barrier assembly 134 that can be utilized within the traction battery pack 18 of the electrified vehicle 10. The exemplary thermal barrier assembly 134 may include a protective housing 146, a thermal insulating barrier 148 within the protective housing 146, and a fin 150 that is connected to an external surface of the protective housing 46. The thermal insulating barrier 148 may be encapsulated inside the protective housing 146 and is therefore shielded by the protective housing 146.

The protective housing 146 may be made of a metallic material or a high temperature resistance polymer composite. In an embodiment, the protective housing is made of stainless steel. However, other materials are further contemplated within the scope of this disclosure.

The thermal insulating barrier 148 may possess a relatively high thermal resistance (and thus a low thermal conductivity) for slowing or even preventing thermal propagation within the traction battery pack 18. In an embodiment, the thermal insulating barrier 148 may include an aerogel material, such as a silica-based aerogel, for example. In another embodiment, the thermal insulating barrier 148 may include a foam material, such as a silicone foam, for example. However, other material or combinations of materials could with utilized to construct the thermal insulating barrier within the scope of this disclosure.

In this implementation, an entirety of the fin 150 is disposed outside of the protective housing 146. The fin 150 therefore does not interface with the thermal insulating barrier 148 in this embodiment. The fin 150 may be integrally formed with the protective housing 146. The fin 150 may be made of a metallic material, such as stainless steel, for example. In an embodiment, the fin 150 is L-shaped, although other shapes are contemplated within the scope of this disclosure.

The fin 150 may interface with the enclosure cover 26. In an embodiment, the fin 150 is fixedly secured to the enclosure cover 26 to increase the overall rigidity of the traction battery pack 18 and prevent the transfer of battery vent byproducts from one compartment 36 to another compartment 36.

An adhesive 156 may be utilized to secure the fin 150 to the enclosure cover 26. The adhesive 56 may be an epoxy based adhesive or a urethane based adhesive, for example, and could be thermally conductive or thermally non-conductive.

The protective housing 146 may further include a locator 158 that is disposed on an opposite end of the protective housing 146 from the fin 150. The locator may be configured to interface with the heat exchanger plate 44. The heat exchanger plate 44 may include one or more slots 60 sized to receive the locator 158. In addition to acting as a locating feature for locating the thermal barrier assembly 134 relative to the heat exchanger plate 44, the locator 158 may establish a thermal break between neighboring battery cells of the cell stack within which the thermal barrier assembly 134 is disposed.

Figure 8:
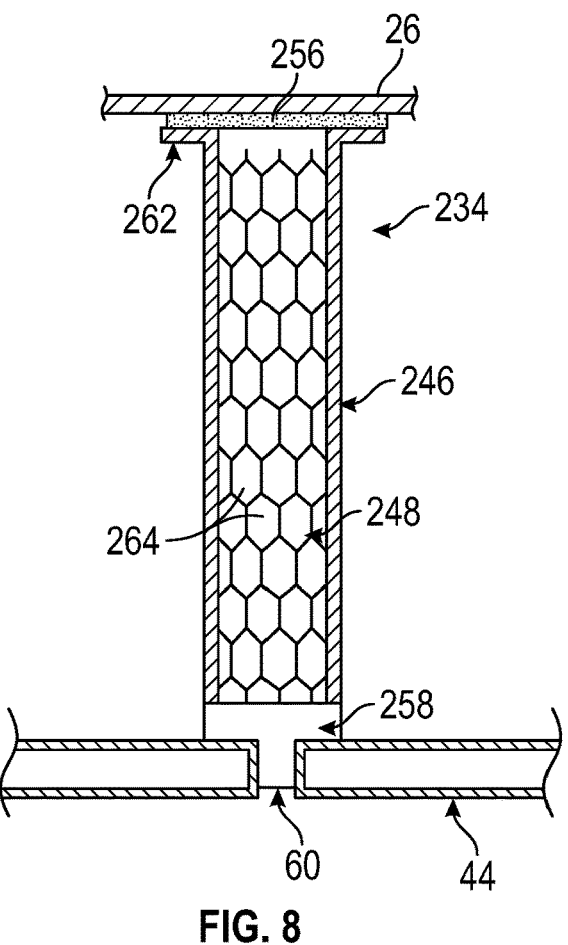
FIG. 8 illustrates another exemplary thermal barrier assembly.
Figure 9:
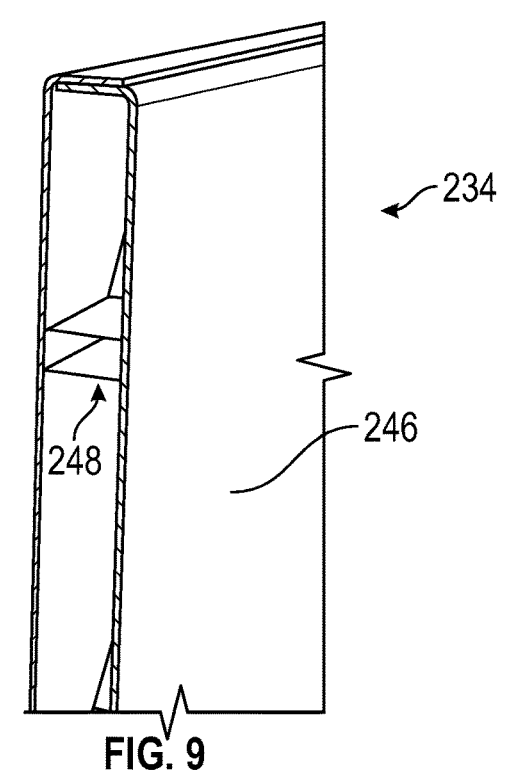
FIG. 9 is a cross-sectional view of the thermal barrier assembly of FIG. 8.

FIGS. 8-9 illustrate another exemplary thermal barrier assembly 234 that can be utilized within the traction battery pack 18 of the electrified vehicle 10. The exemplary thermal barrier assembly 234 may include a protective housing 246 and a thermal insulating barrier 248 within the protective housing 246. The thermal insulating barrier 248 may be encapsulated inside the protective housing 246 and is therefore shielded by the protective housing 246.

In an embodiment, the protective housing 246 is made of a metallic material, such as stainless steel, for example. In another embodiment, the protective housing 246 is made of a ceramic material, such as mica, for example. However, other materials are further contemplated within the scope of this disclosure.

The thermal insulating barrier 248 may possess a relatively high thermal resistance (and thus a low thermal conductivity) for slowing or even preventing thermal propagation within the traction battery pack 18. In an embodiment, the thermal insulating barrier 248 may include an inorganic paper having a honeycomb core 264. However, other material or combinations of materials could with utilized to construct the thermal insulating barrier 248 within the scope of this disclosure.

The protective housing 246 may be configured to interface with the enclosure cover 26. For example, an upper flange 262 of the protective housing 246 may interface with the enclosure cover 26. The upper flange 262 may be fixedly secured to the enclosure cover 26 to increase the overall rigidity of the traction battery pack 18.

An adhesive 256 may be utilized to secure the upper flange 262 to the enclosure cover 26. The adhesive 256 may be an epoxy based adhesive or a urethane based adhesive, for example, and could be thermally conductive or thermally non-conductive.

The protective housing 246 may further include a locator 258 that is disposed on an opposite end of the protective housing 246 from the upper flange 262. The locator 258 may be configured to interface with the heat exchanger plate 44. The heat exchanger plate 44 may include one or more slots 60 sized to receive the locator 258. In addition to acting as a locating feature for locating the thermal barrier assembly relative to the heat exchanger plate 44, the locator 258 may establish a thermal break between neighboring battery cells of the cell stack within which the thermal barrier assembly 234 is disposed.

Figures 10, 11:
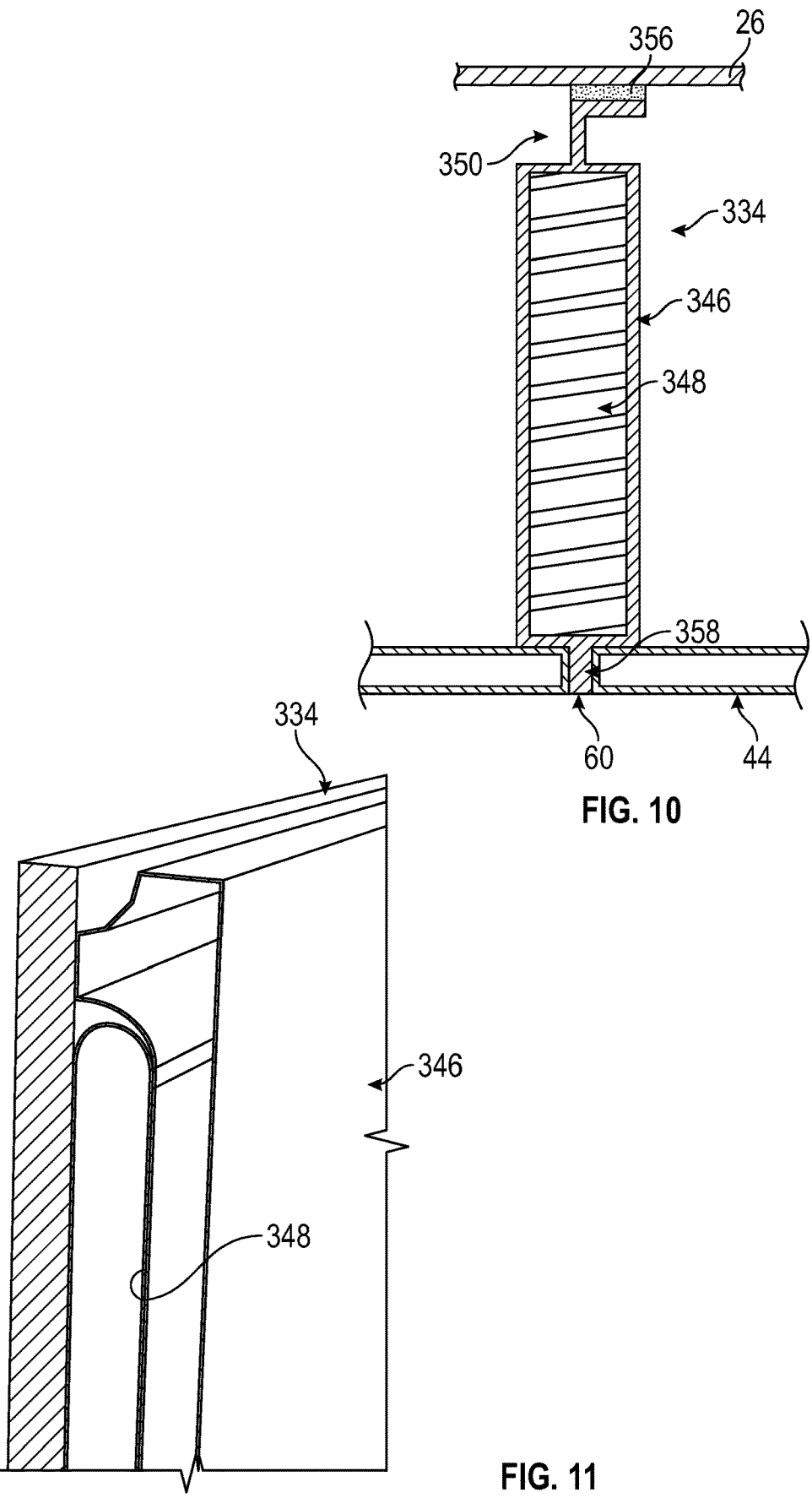
FIG. 10 illustrates another exemplary thermal barrier assembly.
FIG. 11 is a cross-sectional view of the thermal barrier assembly of FIG. 10.

FIGS. 10-11 illustrate yet another exemplary thermal barrier assembly that can be utilized within the traction battery pack 18 of the electrified vehicle 10. The exemplary thermal barrier assembly 334 may include a protective housing 346, a thermal insulating barrier 348 within the protective housing 346, and a fin 350 that is connected to the protective housing 346. The thermal insulating barrier 348 may be encapsulated inside the protective housing 346 and is therefore shielded by the protective housing 346.

The protective housing 346 may be made of a polymeric material. In an embodiment, the protective housing 346 is made of polypropylene, polyethylene, polycarbonate or polyamide composites with glass or carbon fiber and high temperature resistance additives, etc. However, other polymeric materials are contemplated within the scope of this disclosure. The protective housing 346 may be injection molded or spray transfer molded about the thermal insulating barrier 348.

The thermal insulating barrier 348 may possess a relatively high thermal resistance (and thus a low thermal conductivity) for slowing or even preventing thermal propagation within the traction battery pack 18. In an embodiment, the thermal insulating barrier 348 may include an aerogel material, such as a silica-based aerogel, for example. In another embodiment, the thermal insulating barrier 348 may include a foam material, such as a silicone foam, for example. However, other material or combinations of materials could with utilized to construct the thermal insulating barrier within the scope of this disclosure.

In this implementation, an entirety of the fin 350 is disposed outside of the protective housing 346. The fin 350 therefore does not interface with the thermal insulating barrier 348 in this embodiment. In an embodiment, the fin 350 is formed integrally with the protective housing 346. The fin 350 may be made of a metallic material, such as stainless steel, for example. In an embodiment, the fin 350 is L-shaped, although other shapes are contemplated within the scope of this disclosure.

The fin 350 may interface with the enclosure cover 26. In an embodiment, the fin 350 is fixedly secured to the enclosure cover 26 to increase the overall rigidity of the traction battery pack 18.

A thermal adhesive 356 may be utilized to secure the fin 350 to the enclosure cover 26. The thermal adhesive 356 may be an epoxy based adhesive or a urethane based adhesive, for example.

The protective housing 346 may further include a locator 358 that is disposed on an opposite end of the protective housing 346 from the fin 350. The locator may be configured to interface with the heat exchanger plate 44. The heat exchanger plate 44 may include one or more slots 60 sized to receive the locator 358. In addition to acting as a locating feature for locating the thermal barrier assembly 334 relative to the heat exchanger plate 44, the locator 358 may establish a thermal break between neighboring battery cells of the cell stack within which the thermal barrier assembly 334 is disposed.

The exemplary thermal barrier assemblies of this disclosure are designed to mitigate or even prevent thermal propagation inside traction battery packs. The systems may provide numerous advantages over known solutions, including but not limited to presenting a novel configuration that significantly slows or even prevents cell-to-cell, compart-ment-to-compartment, and/or cell stack-to-cell stack trans-fer of a battery thermal event.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illus-trated in these exemplary embodiments, other arrangements could also benefit from the teachings of this disclosure.

The foregoing description shall be interpreted as illustra-tive and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:
a cell stack including a plurality of battery cells stacked between a first cross-member beam and a second cross-member beam,
wherein the first cross-member beam is positioned adja-cent to a third cross-member beam of a second cell stack, and a venting passageway extends between the first cross-member beam and the third cross-member beam; and
a thermal barrier assembly arranged between a first bat-tery cell and a second battery cell of the plurality of battery cells,
wherein the thermal barrier assembly includes a protec-tive housing and a thermal insulating barrier that is disposed within the protective housing, wherein the thermal insulating barrier includes an aerogel material, a foam material, or an inorganic paper.

2. The traction battery pack as recited in claim 1, wherein the protective housing is comprised of a stainless steel foil, and the thermal insulating barrier includes the aerogel material.

3. The traction battery pack as recited in claim 1, wherein the thermal barrier assembly further includes a fin.

4. The traction battery pack as recited in claim 3, wherein a first fin section of the fin is disposed inside the protective housing, and a second fin section of the fin extends outside of the protective housing.

5. The traction battery pack as recited in claim 4, wherein the second fin section extends at a transverse angle relative to the first fin section and is fixedly secured to an enclosure cover of the traction battery pack.

6. The traction battery pack as recited in claim 3, wherein the fin is completely outside of the protective housing.

7. The traction battery pack as recited in claim 1, wherein the protective housing is comprised of stainless steel, and the thermal insulating barrier includes the aerogel material.

8. The traction battery pack as recited in claim 7, com-prising a thermal fin that is mounted to the protective housing and to an enclosure cover of the traction battery pack.

9. The traction battery pack as recited in claim 1, wherein the protective housing is comprised of stainless steel, and the thermal insulating barrier includes the inorganic paper hav-ing a honeycomb core.

10. The traction battery pack as recited in claim 1, wherein the protective housing is comprised of a mica material, and the thermal insulating barrier includes the inorganic paper having a honeycomb core.

11. The traction battery pack as recited in claim 1, wherein the protective housing is comprised of a polymeric material, and the thermal insulating barrier includes the aerogel material or the foam material.

12. The traction battery pack as recited in claim 1, wherein a vertically upper side of the venting passageway is established by an enclosure cover of the traction battery pack, and a vertically lower side of the venting passageway is established by a heat exchanger plate of the traction battery pack.

13. A traction battery pack, comprising:
a cell stack including a plurality of battery cells; and
a thermal barrier assembly arranged between a first bat-tery cell and a second battery cell of the plurality of battery cells,
wherein the thermal barrier assembly includes a protec-tive housing and a thermal insulating barrier that is disposed within the protective housing,
wherein the thermal insulating barrier includes an aerogel material, a foam material, or an inorganic paper,
wherein an L-shaped fin extends from a first side of the protective housing and is secured directly to an enclo-sure cover of the traction battery pack, and a locator extends from a second, opposite side of the protective housing and is received within a slot of a heat exchanger plate of the traction battery pack.

14. A traction battery pack, comprising:
a heat exchanger plate;
a cell stack positioned to interface with the heat exchanger plate;
a thermal barrier assembly arranged between a first bat-tery cell and a second battery cell of the cell stack;

the thermal barrier assembly includes a protective housing and a thermal insulating barrier that is encapsulated inside the protective housing;

the thermal insulating barrier includes an inorganic paper having a honeycomb core; and the protective housing includes a locator received within a slot of the heat exchanger plate for locating the thermal barrier assembly relative to the heat exchanger plate.

\* \* \* \* \*